3,120,541
1-CARBOXY OR CARBALKOXY-ALKYLENE-4-PHENYL-4-CARBETHOXY-PIPERIDINES
Rolf Denss, Alex Meisels, and Hugo Ryf, Basel, Switzerland, assignors to Geigy Chemical Corporation, Ardsley, N.Y., a corporation of Delaware
No Drawing. Filed Nov. 24, 1961, Ser. No. 154,852
Claims priority, application Switzerland Nov. 25, 1960
15 Claims. (Cl. 260—294.3)

The present invention concerns new piperidine derivatives which have valuable pharmacological properties.

It has surprisingly been found that piperidine derivatives of the general formula

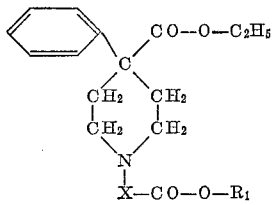

wherein $R_1$ is a member selected from the group consisting of hydrogen, lower alkyl, phenyl, benzyl and furfuryl and X is alkylene having at least one and at most four carbon atoms as well as their salts with acids have useful pharmacological properties, in particular central depressing, antitussive analgetic and spasmolytic activity and, at the same time, relatively slight toxicity. Furthermore, they potentiate the action of other medicaments, in particular anaesthetics. They can be administered orally as such or in the form of their salts and, in the form of aqueous solutions of their salts, they can also be administered parenterally.

In addition, they are suitable as intermediate products for the production of other analgetically active substances. In the compounds of the general Formula I $R_1$ is, for example, hydrogen, a methyl, ethyl, n-propyl, isopropyl, n-butyl, n-hexyl, n-octyl, n-dodecyl, methoxyethyl, ethoxyethyl, allyl, methallyl or crotyl radical or a phenyl, benzyl, α-phenylethyl, β-phenylethyl, α-methyl-β-phenylethyl, γ-phenylpropyl, β-phenoxyethyl or β-benzyloxyethyl radical the benzene ring of which can be substituted by, for example, one or more low alkyl or alkoxy radicals, and/or an acetamido or nitro group. In addition, $R_1$ is, for example, a tetrahydrofurfuryl, furyl-(2)-methyl, piperidinoethyl, pyrrolidinyl-(1)-ethyl, 1-methyl-piperidyl-(4), 1-methyl-piperidyl-(2)-ethyl, 1-methyl-piperidyl-(3)-methyl, α-pyridyl, β-pyridyl, γ-pyridyl, β-(γ'-pyridylmercapto)-ethyl, β-[4-methyl-piperazinyl-(1)]-ethyl, morpholino-ethyl, pyrimidyl-(2), 4,6-dimethyl-pyrimidyl-(2), 2,6-dimethyl-pyrimidyl-(4), 2,6-dimethoxy-pyrimidyl-(4) or β-[4-methyl-pyrimidyl-(2)-mercapto]-ethyl radical.

X is, for example, the methylene, ethylene, ethylidene, 1,2-propylene, trimethylene, 1,2-butylene, 2,3-butylene, 1,3-butylene, 1,3-isobutylene or tetramethylene radical.

The radicals $R_1$ given above are only examples to illustrate the invention which is by no means limited to the production of compounds which contain only the radicals mentioned.

To produce the new compounds of the general Formula I, a compound of the formula

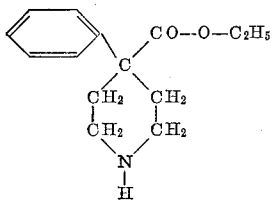

is reacted with halogen alkanoic acids or the esters thereof of the general formula $$\text{Hal}—X—CO—O—R_1 \qquad \text{III}$$

wherein Hal represents a halogen atom, in particular chlorine or bromine and $R_1$ and X have the meanings given above.

The reaction is performed, if desired, in the presence of inorganic or organic acid binding agents such as, e.g. sodium or potassium carbonate, or tertiary organic bases such as triethylamine, tributylamine, dimethyl-aniline or pyridine, in the presence or absence of an inert organic solvent such as, e.g. methanol, ethanol, benzene, toluene, xylene, decalin or dimethyl formamide, and it is performed in the warm, for example, at the boiling temperature of the solvents mentioned. The starting material of the general Formula II and numerous starting materials of the general Formula III are known and others can be produced in an analogous manner.

Compounds of the general Formula I in which X is the ethylene, 1,2-propylene or 2,3-butylene radical are obtained by another process by adding compounds of the general Formula II above to compounds of the general formula

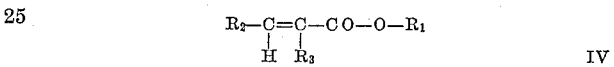

wherein $R_2$ and $R_3$ are hydrogen or methyl radicals and $R_1$ has the meaning given above. The addition can be made, for example, by warming the reaction components in organic solvents such as ethanol or another low alkanol used as alcohol component in the compound of Formula IV, in dioxan, benzene or toluene. Numerous starting materials of the general Formula IV, in particular acrylic acid ester, α-methacrylic acid ester and crotonic acid ester, are known and others can be produced in an analogous manner.

Finally, if desired, it is possible to convert compounds of the general Formula I into other compounds also embraced by this formula. For example, if desired, compounds embraced by the general Formula I of the general formula

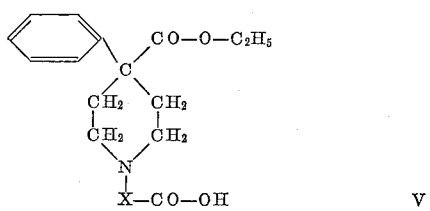

wherein X has the meaning given above are esterified by condensing them, possibly after conversion into reactive functional derivatives such as halides or anhydrides, in particular mixed anhydrides with acetic acid, with hydroxy compounds of the general formula $$R_1'—OH \qquad \text{VI}$$

in which $R_1'$ has the meaning given above for $R_1$ with the exception of hydrogen, the condensation being performed in the presence of acid binding agents, or the compounds of the general Formula V can be reacted with low diazo alkanes whereupon the esters embraced by the general Formula I are obtained. Such esters are also obtained by reacting salts, in particular metal salts, of compounds of the general Formula V with reactive esters of hydroxy compounds of the general formula $$R_1''—OH \qquad \text{VII}$$

wherein $R_1''$ has the meaning given for $R_1$ in general Formula I with the exception of hydrogen and aromatic radicals.

On the other hand, if desired, diesters which are also embraced by the general Formula I, i.e. compounds of the general formula

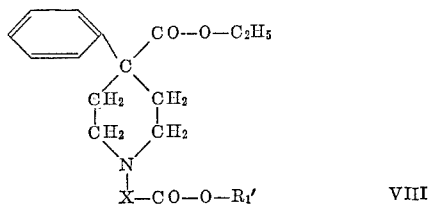

wherein $R_1'$ and X have the meanings given above but $R_1'$ is preferably a low alkyl radical, can be partially hydrolysed to the corresponding compounds of the general formula I while retaining the carbethoxy group in 4-position, in which latter compounds $R_1$ is hydrogen. This is done, for example, by heating the diesters on the equimolar amount of an alcoholic/aqueous soda or caustic potash lye.

If desired, the compounds of the general Formula I are converted in the known manner into their salts with inorganic or organic acids. Acids suitable for salt formation are, e.g. hydrochloric acid, hydrobromic acid, sulphuric acid, phosphoric acid, methane sulphonic acid, ethane disulphonic acid, acetic acid, lactic acid, succinic acid, maleic acid, fumaric acid, malic acid, tartaric acid, citric acid, benzoic acid, salicyclic acid and mandelic acid.

The new compounds or compatible salts thereof are useful as medicaments, for example, in the form of pharmaceutical preparations which contain the new compounds or pharmaceutically acceptable salts thereof in admixture with a pharmaceutical organic or inorganic solid or liquid carrier suitable for enteral or parenteral administration. Substances can be used to make up the preparations which do not react with the new compounds such as, for example, water, gelatine, sugar, dextrose, lactose, starches, stearic acid, magnesium or calcium stearate, methyl cellulose, talcum, agar, tragacanth, vegetable oils, benzyl alcohols, gums, polyalkylene glycols, cholesterol or any other known carrier for medicaments. The pharmaceutical preparations may be, for example, in the form of tablets, dragees (coated tablets), capsules, ointments, creams or in liquid form such as solutions, suspensions or emulsions. The solutions of the soluble salts of the new compounds described above are suitable for injection. If desired, they may be sterilised and/or they may contain auxiliary substances such as preserving agents, stabilising agents, wetting or emulsifying agents, salts for adapting the osmotic pressure or buffers. The new compounds can also be incorporated into semi-solid substances which melt within a suitable range, e.g. cocoa butter, to form suppositories. They may also contain other therapeutically useful substances.

The following examples further illustrate the production of the new compounds according to the invention. Parts are given therein as parts by weight; their relationship to parts by volume is as that of grammes to cubic centimetres. The temperatures are in degrees centigrade.

*Example 1*

50 parts by volume of benzene are added to 5.3 parts of 4-phenyl-4-carbethoxy-piperidine carbonate (4-phenyl-isonipecotinic acid ethyl ester carbonate, produced according to Thorp and Walton, J. Chem. Soc. 1948, 559) and the mixture is refluxed until all the substance has dissolved with development of carbon dioxide. A solution of 1.22 parts of chloroacetic acid ethyl ester in 20 parts by volume of benzene is then added dropwise at 20° whereupon the reaction mixture is refluxed for 15 minutes. After cooling, the 4-phenyl-4-carbethoxy-piperidine hydrochloride which has precipitated is filtered off, the filtrate is evaporated to dryness in vacuo, the residue is taken up in 500 parts by volume of ether and the ethereal solution is repeatedly extracted with 2 N-sodium hydroxide solution. The ethereal solution is washed with water until the washings are neutral and then an excess of Dry Ice is added and the 4-phenyl-4-carbethoxy-piperidine carbonate precipitated in this way is filtered off. The ethereal filtrate is concentrated whereupon 1-(carbethoxymethyl)-4-phenyl-4-carbethoxy-piperidine remains. It boils at 136–137° under 0.03 mm. Hg pressure.

The following compounds are obtained in an analogous manner:

1-($\alpha$-carbethoxy-propyl)-4-phenyl-4-carbethoxy-piperidine, B.P.$_{0.0001}$ 158–161°, M.P. of the hydrochloride from methanol/ether: 111–113°;

1-($\beta$-carbophenoxy-ethyl)-4-phenyl-4-carbethoxy-piperidine hydrochloride, M.P. 152–154° (from methanol/ether);

1-($\beta$-carbo-tert. butoxy-ethyl)-4-phenyl-4-carbethoxy-piperidine hydrochloride.

*Example 2*

0.32 part of 1-carbethoxymethyl-4-phenyl-4-carbethoxy-piperidine is dissolved in 10 parts by volume of methanol, 1.1 parts by volume of 1 N-sodium hydroxide solution are added and the whole is refluxed for 1 hour. After distilling off all the methanol in vacuo, 25 parts of water are added to the residue and the alkaline solution is extracted twice with ether. The aqueous/alkaline solution is then filtered through a column of 10 parts of Amberlite IRC–50 ($H^+$ form), washed with 250 parts of water and the combined filtrates are evaporated to dryness in vacuo. The crude 1-carboxymethyl-4-phenyl-4-carbethoxy-piperidine so obtained is recrystallised from hot benzene. M.P. 153–154° (see Example 3).

*Example 3*

5.3 parts of 4-phenyl-4-carbethoxy-piperidine carbonate are dissolved in 50 parts by volume of methanol and refluxed until no more carbon dioxide is developed. After cooling, 1.8 parts of chloroacetic acid are added whereupon the mixture is left to stand for several days at room temperature. The solvent is then distilled off in vacuo, 30 parts by volume of 1 N-sodium hydroxide solution are then added to the residue which is extracted twice with ether to remove non-reacted 4-phenyl-4-carbethoxy-piperidine. The aqueous/alkaline solution is filtered through a column of 160 parts of Amberlite IRC–50 ($H^+$ form), washed with 2000 parts by volume of water and the combined filtrates are evaporated to dryness in vacuo. The 1-carboxymethyl-4-phenyl-4-carbethoxy-piperidine so obtained is recrystallised from benzene. M.P. 153–154° (see Example 2).

*Example 4*

2.9 parts of 4-phenyl-4-carbethoxy-piperidine carbonate are dissolved in 50 parts by volume of anhydrous alcohol and the solution is refluxed until the development of carbon dioxide is completed. Then a solution of 1 part of acrylic acid ethyl ester in 10 parts by volume of anhydrous alcohol is added dropwise to the boiling solution and the reaction mixture is refluxed for another 2 hours. After distilling off the solvent, the 1-($\beta$-carbethoxyethyl)-4-phenyl-4-carbethoxy-piperidine which remains is purified by distillation and it then boils at 140–141° under 0.01 mm. Hg pressure. To produce the hydrochloride, the base is dissolved in the calculated amount of 1 N-hydrochloric acid and evaporated to dryness in vacuo. The hydrochloride so obtained melts, after recrystallisation from methanol/ether, at 140–141°.

*Example 5*

0.66 part of 1-($\beta$-carbethoxyethyl)-4-phenyl-4-carbethoxy-piperidine is dissolved in 20 parts by volume of methanol. 2.2 parts by volume of 1 N-sodium hydroxide solution are added and the whole is refluxed for 1 hour. After the methanol has been completely distilled off in vacuo, 50 parts of water are added to the residue and the alkaline solution is extracted twice with ether. The aqueous/alkaline solution is filtered through a column of 20 parts of Amberlite IRC–50 (H⁺ form), washed with 500 parts of water and the combined filtrates are evaporated to dryness in vacuo. The crude 1-(β-carboxyethyl)-4-phenyl-4-carbethoxy-piperidine so obtained is recrystallised from acetone/hexane when it then melts at 142–143°.

*Example 6*

5.3 parts of 4-phenyl-4-carbethoxy-piperidine carbonate and 4.4 parts of methacrylic acid methyl ester are refluxed for 3 hours. After cooling, the reaction mixture is dissolved in 300 parts by volume of ether and non-reacted 4-phenyl-4-carbethoxy-piperidine, in the form of the carbonate, is removed. After distillation, 1-(β-carbomethoxypropyl) - 4 - phenyl-4-carbethoxy-piperidine remains which boils at 157–159° under 0.001 mm. Hg pressure.

The hydrochloride, produced as described in Example 4 melts, after recrystallisation from acetone/petroleum ether, at 115–117°.

1 - (β - carbethoxy-isopropyl)-4-phenyl-4-carbethoxy-piperidine B.P.$_{0.0001}$ 170–175°, M.P. of the hydrochloride (from methanol/ether) 145–147°, is obtained in an analogous manner.

*Example 7*

2.1 parts of 4-phenyl-4-carbethoxy-piperidine carbonate and 1 part of acrylic acid methyl ester are refluxed at 80° for 2 hours. After cooling, the reaction mixture is taken up in 500 parts by volume of ether and an excess of solid carbon dioxide is added to this solution. The excess 4-phenyl-4-carbethoxy-piperidine carbonate which precipitates is removed by filtration and the ethereal solution is concentrated. The oily product is taken up in benzene and is purified through a column of 10 parts of aluminium oxide activity I ("Woelm"). The 1-(β-carbomethoxy-ethyl)-4-phenyl-4-carbethoxy-piperidine is recrystallised from benzene. M.P. 45–47°.

The following compounds are produced in the same way:

1-(β-carbobenzyloxyethyl)-4-phenyl-4-carbethoxy-piperidine, M.P. 180–190° under 0.01 mm.
1-(β - carbofurfuryloxyethyl) - 4 - phenyl - 4 - carbethoxy-piperidine, hydrochloride M.P. 118–120°.

*Example 8*

1 part of 1 - (β-carbethoxy-ethyl)-4-phenyl-4-carbethoxy-piperidine in 20 parts by volume of methylene chloride and 0.26 part of pyridine are cooled to 0°. Then 0.39 part of thionyl chloride in 5 parts by volume of methylene chloride are added dropwise at 0–5°. On completion of the addition, the whole is stirred for two hours with ice cooling. A solution of 0.35 part of benzyl alcohol and 0.26 part of pyridine in 5 parts by volume of methylene chloride is then added at 0° and the whole is stirred overnight at room temperature. After evaporating off the solvent, the residue is taken up in 300 parts by volume of ether and the ethereal solution is extracted three times with 2 N-sodium carbonate solution. The ether solution is washed neutral with water, dried with sodium sulphate and concentrated. The 1-(β-carbobenzyloxy-ethyl)-4-phenyl-4-carbethoxy - piperidine obtained distills at 180–190° under 0.01 mm.

1 - (β - carbofurfuryloxy - ethyl) - 4 - phenyl-4-carbethoxy-piperidine is obtained in the same way. The hydrochloride melts at 118–120°.

*Example 9*

A mixture of 5.28 parts of 4-phenyl-4-carbethoxy-piperidine carbonate in 100 parts by volume of anhydrous decalin is boiled for 15 minutes whereupon a solution is obtained. Then 15.6 parts of γ-bromobutyric acid ethyl ester, 2.5 parts of anhydrous potassium carbonate and 0.1 part of potassium iodide are added and the whole is refluxed for 2 hours while excluding moisture. After cooling, the reaction mixture is diluted with 200 parts by volume of ether and then extracted several times with ice cold dilute hydrochloric acid. The oily base which is obtained from the hydrochloric acid solution by the addition of concentrated NaOH at 0–5° is extracted with ether, the ether phase is washed first with sodium carbonate solution and then with water and, after drying with sodium sulphate, is concentrated. The 1-(γ-carbethoxy-propyl)-4-phenyl-4-carbethoxy-piperidine which remains boils at 195–200° under 10⁻⁴ mm. pressure. The maleic acid salt melts, after recrystallisation from methanol-ether, at 111.5–113.5°.

The 1-(γ-carbomethoxy-propyl)-4-phenyl-4-carbethoxy-piperidine obtained in an analogous manner boils at 169–171° under 10⁻⁴ mm. pressure. Its maleate melts at 117–118.5° (from methanol-ether).

What is claimed is:

1. A member selected from the group consisting of a compound of the formula

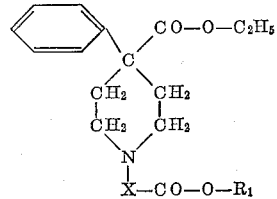

wherein R₁ is a member selected from the group consisting of hydrogen, lower alkyl, phenyl, benzyl and furfuryl, and X is alkylene having at least one and at most four carbon atoms, and the pharmaceutically acceptable acid addition salts thereof.

2. 1 - (carbethoxymethyl) - 4 - phenyl - 4 - carbethoxy-piperidine.
3. 1 - (α - carbethoxy - propyl) - 4 - phenyl - 4 - carbethoxy-piperidine.
4. 1 - (β - carbophenoxy - ethyl) - 4 - phenyl - 4 - carbethoxy-piperidine hydrochloride.
5. 1 - (β - carbo - tert.butoxy - ethyl) - 4 - phenyl - 4-carbethoxy-piperidine hydrochloride.
6. 1 - carboxymethyl - 4 - phenyl - 4 - carbethoxy - piperidine.
7. 1 - (β - carbethoxy - ethyl) - 4 - phenyl - 4 - carbethoxy-piperidine.
8. 1 - (β - carboxy - ethyl) - 4 - phenyl - 4 - carbethoxy-piperidine.
9. 1 - (β - carbomethoxy - propyl) - 4 - phenyl - 4 - carbethoxy-piperidine.
10. 1 - (β - carbethoxy - isopropyl) - 4 - phenyl - 4-carbethoxy-piperidine.
11. 1 - (β - carbomethoxy - ethyl) - 4 - phenyl - 4 carbethoxy-piperidine.
12. 1 - (β - carbobenzyloxy - ethyl) - 4 - phenyl - 4-carbethoxy-piperidine.
13. 1 - (β-carbofurfuryloxy - ethyl) - 4 - phenyl - 4-carbethoxy-piperidine hydrochloride.
14. 1 - (γ - carbethoxy - propyl) - 4 - phenyl - 4 - carbethoxy-piperidine.
15. 1 - (γ - carbomethoxy - propyl) - 4 - phenyl - 4-carbethoxy-piperidine.

References Cited in the file of this patent

FOREIGN PATENTS 569,664  Belgium _____ Aug. 14, 1958

OTHER REFERENCES

Braenden et al.: "Bull. Wld. Hlth. Org.," vol. 13, page 961 (1955).